US012418216B2

(12) United States Patent
Fieldbinder et al.

(10) Patent No.: US 12,418,216 B2
(45) Date of Patent: Sep. 16, 2025

(54) POWER TOOL MOTOR BRAKING USING MAGNETICALLY SUSCEPTIBLE FLUID

(71) Applicant: MILWAUKEE ELECTRIC TOOL CORPORATION, Brookfield, WI (US)

(72) Inventors: Douglas R. Fieldbinder, Greendale, WI (US); Nikita Bhatt, Chicago, IL (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 99 days.

(21) Appl. No.: 18/451,171

(22) Filed: Aug. 17, 2023

(65) Prior Publication Data
US 2024/0063688 A1  Feb. 22, 2024

Related U.S. Application Data

(60) Provisional application No. 63/371,925, filed on Aug. 19, 2022.

(51) Int. Cl.
| | |
|---|---|
| *B25F 5/00* | (2006.01) |
| *F16D 57/00* | (2006.01) |
| *H02K 7/102* | (2006.01) |
| *H02K 7/116* | (2006.01) |
| *H02K 7/14* | (2006.01) |
| *H02P 3/04* | (2006.01) |
| *F16H 57/04* | (2010.01) |

(52) U.S. Cl.
CPC ........... *H02K 7/1023* (2013.01); *B25F 5/001* (2013.01); *F16D 57/002* (2013.01); *H02K 7/116* (2013.01); *H02K 7/145* (2013.01); *H02P 3/04* (2013.01); *F16H 57/0495* (2013.01)

(58) Field of Classification Search
CPC ...... H02K 7/1023; H02K 7/116; H02K 7/145; B25F 5/001; F16D 57/002; H02P 3/04; F16H 57/0495
See application file for complete search history.

(56) References Cited

U.S. PATENT DOCUMENTS

| | | |
|---|---|---|
| 11,014,224 B2 | 5/2021 | Dey, IV et al. |
| 2010/0223760 A1 | 9/2010 | Henke et al. |
| 2021/0229259 A1* | 7/2021 | Dey, IV ............... B25D 17/245 |

* cited by examiner

*Primary Examiner* — Michelle Lopez
(74) *Attorney, Agent, or Firm* — Michael Best & Friedrich LLP (57) ABSTRACT

Systems and methods for braking a power tool motor using a magnetically susceptible fluid. One power tool includes a housing, a motor within the housing, a drive train coupled to the motor, a magnetically susceptible fluid located within the drive train, and an inductor within the housing and configured to introduce a magnetic field to the magnetically susceptible fluid. An electronic controller is connected to the motor and to the inductor and is configured to receive a signal to initiate a braking process, generate, in response to the initiation of the braking process, a control signal for the inductor, and provide the control signal to the inductor to control a viscosity of the magnetically susceptible fluid located within the drive train.

20 Claims, 9 Drawing Sheets

POWER TOOL MOTOR BRAKING USING MAGNETICALLY SUSCEPTIBLE FLUID

RELATED APPLICATIONS

This application claims the benefit of U.S. Provisional Patent Application No. 63/371,925, filed Aug. 19, 2022, the entire content of which is hereby incorporated by reference.

SUMMARY

Embodiments described herein provide systems and methods for braking a power tool motor using a magnetically susceptible fluid.

Power tools described herein include a housing, a motor within the housing, a drive train coupled to the motor, a magnetically susceptible fluid located within the drive train, an inductor within the housing and configured to introduce a magnetic field to the magnetically susceptible fluid, and an electronic controller including a memory and an electronic processor. The electronic controller is connected to the motor and the inductor. The electronic controller is configured to receive a signal to initiate a braking process, generate, in response to the initiation of the braking process, a control signal for the inductor, and provide the control signal to the inductor to control a viscosity of the magnetically susceptible fluid located within the drive train.

In some aspects, the drive train includes one or more gears, wherein the magnetically susceptible fluid is configured to lubricate the one or more gears when in a non-magnetized state.

In some aspects, the viscosity of the magnetically susceptible fluid is proportional to a strength of the magnetic field.

In some aspects, the magnetically susceptible fluid is a magneto-rheological fluid including a plurality of magnetizable particles.

In some aspects, the electronic controller is further configured to provide the control signal to the inductor to magnetize the plurality of magnetizable particles.

In some aspects, the electronic controller is further configured to determine whether the motor has braked to a stop, and stop, in response to the motor being braked to a stop, providing the control signal to the inductor.

In some aspects, the electronic controller is further configured to receive, from an external device, one or more braking parameters, and generate the control signal for the inductor based on the one or more braking parameters.

In some aspects, the one or more braking parameters include at least one selected from a group consisting of a minimum viscosity of the magnetically susceptible fluid, a maximum viscosity of the magnetically susceptible fluid, a braking force applied by the magnetically susceptible fluid, and an amount of time to provide the control signal to the inductor.

Methods for braking a power tool described herein include receiving a signal to initiate a braking process to brake a motor. The motor is coupled to a drive train. The method includes generating, in response to the initiation of the braking process, a control signal for an inductor. The inductor is configured to introduce a magnetic field to a magnetically susceptible fluid within the drive train. The method includes providing, during the braking process, the control signal to the inductor to control a viscosity of the magnetically susceptible fluid within the drive train.

In some aspects, the method further includes lubricating, with the magnetically susceptible fluid, one or more gears within the drive train.

In some aspects, the magnetically susceptible fluid is a magneto-rheological fluid including a plurality of magnetizable particles, and the method further includes providing the control signal to the inductor to magnetize the plurality of magnetizable particles.

In some aspects, the method further includes determining whether the motor has braked to a stop, and stopping, in response to the motor being braked to a stop, providing the control signal to the inductor.

In some aspects, the method further includes receiving, from an external device, one or more braking parameters, and generating the control signal for the inductor based on the one or more braking parameters.

In some aspects, the one or more braking parameters include at least one selected from a group consisting of a minimum viscosity of the magnetically susceptible fluid, a maximum viscosity of the magnetically susceptible fluid, a braking force applied by the magnetically susceptible fluid, and an amount of time to provide the control signal to the inductor.

Power tools described herein include a housing, a trigger, a motor within the housing, a drive train coupled to the motor, a magnetically susceptible fluid located within the drive train, an inductor within the housing and configured to introduce a magnetic field to the magnetically susceptible fluid, and an electronic controller including a memory and an electronic processor. The electronic controller is connected to the trigger, the motor, and the inductor. The electronic controller is configured to drive, in response to actuation of the trigger, the motor, initiate, in response to de-actuation of the trigger, a braking event, and provide, during the braking event, current to the inductor to control a viscosity of the magnetically susceptible fluid located within the drive train.

In some aspects, the drive train includes one or more gears, wherein the magnetically susceptible fluid is configured to lubricate the one or more gears when in a non-magnetized state.

In some aspects, the magnetically susceptible fluid is a magneto-rheological fluid including a plurality of magnetizable particles.

In some aspects, the electronic controller is further configured to provide the control signal to the inductor to magnetize the plurality of magnetizable particles.

In some aspects, the electronic controller is further configured to receive, from an input device, one or more braking parameters, and generate the control signal for the inductor based on the one or more braking parameters.

In some aspects, the one or more braking parameters include at least one selected from a group consisting of a minimum viscosity of the magnetically susceptible fluid, a maximum viscosity of the magnetically susceptible fluid, a braking force applied by the magnetically susceptible fluid, and an amount of time to provide the control signal to the inductor.

Before any embodiments are explained in detail, it is to be understood that the embodiments are not limited in application to the details of the configurations and arrangements of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Accordingly, in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

Other features and aspects will become apparent by consideration of the following detailed description and accompanying drawings.

DETAILED DESCRIPTION

Figure 1:
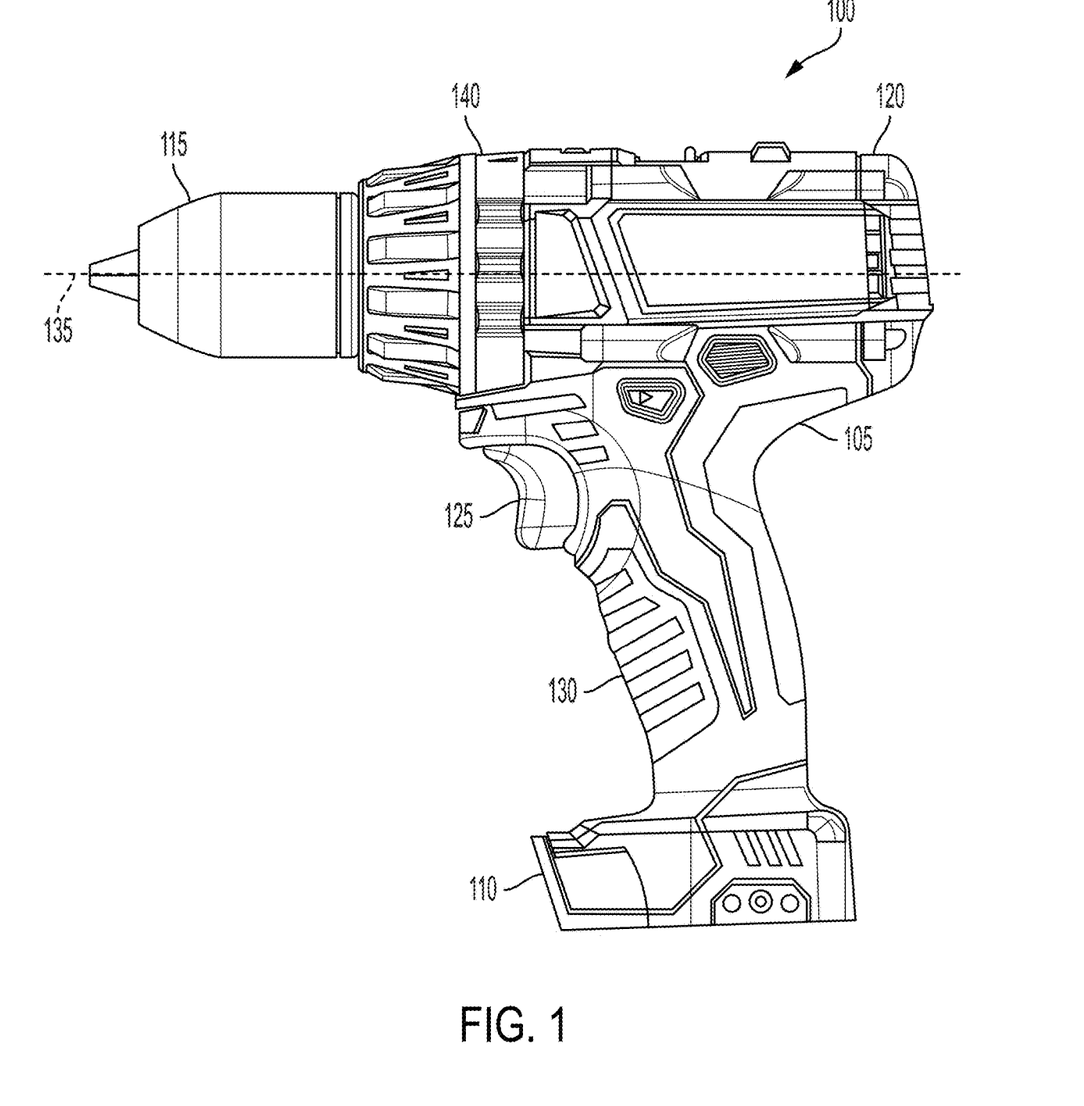
FIG. 1 illustrates a power tool in accordance with embodiments described herein.

FIG. 1 illustrates an example power tool 100, according to some embodiments. The power tool 100 includes a housing 105, a battery pack interface 110, a driver 115 (e.g., a chuck or bit holder), a motor housing 120, a trigger 125, and a handle 130. The motor housing 120 houses a motor 250 (see FIG. 2). A longitudinal axis 135 extends from the driver 115 through a rear of the motor housing 120. During operation, the driver 115 rotates about the longitudinal axis 135. The longitudinal axis 135 may be approximately perpendicular with the handle 130. While FIG. 1 illustrates a specific power tool 100, it is contemplated that a magnetically susceptible fluid (e.g., ferrofluid) described herein may be used with multiple types of power tools, such as drills, drivers, powered screw drivers, powered ratchets, grinders, right angle drills, rotary hammers, pipe threaders, reciprocal saws, chainsaws, pole-saws, circular saws, cut-off saws, die-grinder, table saws, and other indoor and outdoor power tools driven by a motor.

Figure 2:
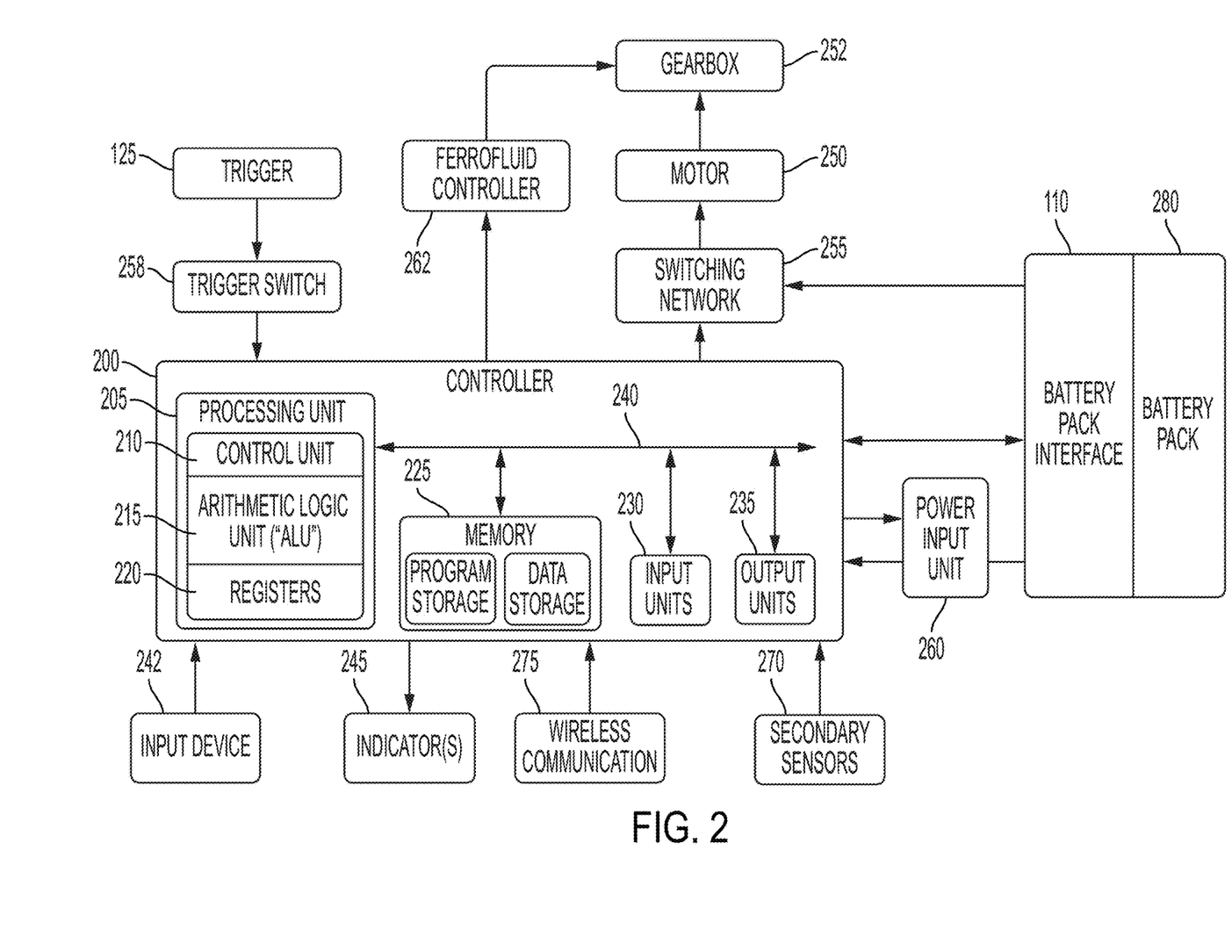
FIG. 2 illustrates a block diagram of a controller for the power tool of FIG. 1 in accordance with embodiments described herein.

A power tool controller 200 for the power tool 100 is illustrated in FIG. 2. The power tool controller 200 is electrically and/or communicatively connected to a variety of modules or components of the power tool 100. For example, the illustrated power tool controller 200 is connected to an input device 242, indicators 245, secondary sensor(s) 270 (e.g., a current sensor, a voltage sensor, a temperature sensor, a speed sensor, etc.), the trigger 125 (via a trigger switch 258), a power switching network 255, a power input unit 260, a wireless communication controller 275, and a ferrofluid controller 262 (e.g., a gearbox coil or a gearbox inductor 262).

The power tool controller 200 includes a plurality of electrical and electronic components that provide power, operational control, and protection to the components and modules within the power tool controller 200 and/or power tool 100. For example, the power tool controller 200 includes, among other things, a processing unit 205 (e.g., a microprocessor, an electronic processor, an electronic controller, a microcontroller, or another suitable programmable device), a memory 225, input units 230, and output units 235. The processing unit 205 includes, among other things, a control unit 210, an arithmetic logic unit ("ALU") 215, and a plurality of registers 220 (shown as a group of registers in FIG. 2), and is implemented using a known computer architecture (e.g., a modified Harvard architecture, a von Neumann architecture, etc.). The processing unit 205, the memory 225, the input units 230, and the output units 235, as well as the various modules connected to the power tool controller 200 are connected by one or more control and/or data buses (e.g., common bus 240). The control and/or data buses are shown generally in FIG. 2 for illustrative purposes. The use of one or more control and/or data buses for the interconnection between and communication among the various modules and components would be known to a person skilled in the art in view of the embodiments described herein.

The memory 225 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 205 is connected to the memory 225 and executes software instructions that are capable of being stored in a RAM of the memory 225 (e.g., during execution), a ROM of the memory 225 (e.g., on a generally permanent basis), or another non-transitory computer readable medium such as another memory or a disc. Software included in the implementation of the power tool 100 can be stored in the memory 225 of the power tool controller 200. The software includes, for example, firmware, one or more applications, program data, filters, rules, one or more program modules, and other executable instructions. The power tool controller 200 is configured to retrieve from the memory 225 and execute, among other things, instructions related to the control processes and methods described herein. In other embodiments, the power tool controller 200 includes additional, fewer, or different components.

The power tool controller 200 drives the motor 250 to rotate the driver 115 in response to a user's actuation of the trigger 125. The driver 115 may be coupled to the motor 250 via an output shaft or gearbox 252 (described in more detail with respect to FIG. 6). Depression of the trigger 125 actuates a trigger switch 258, which outputs a signal to the power tool controller 200 to drive the motor 250, and therefore the driver 115. In some embodiments, the power tool controller 200 controls the power switching network 255 (e.g., a FET switching bridge) to drive the motor 250. For example, the power switching network 255 may include a plurality of high side switching elements (e.g., FETs) and a plurality of low side switching elements. The power tool controller 200 may control each FET of the plurality of high side switching elements and the plurality of low side switching elements to drive each phase of the motor 250. For example, the power switching network 255 may be controlled to more quickly deaccelerate the motor 250. The controller 200 may also control a gearbox inductor 262 to magnetize a magnetically-susceptible fluid and more quickly deaccelerate the motor 250, described below in more detail.

The input device 242 is, for example, a touchscreen, buttons, switches, knobs, or other devices that allow a user to input information to the power tool controller 200. The indicators 245 are also connected to the power tool controller 200 and receive control signals from the power tool controller 200 to turn on and off or otherwise convey information based on different states of the power tool 100. The indicators 245 include, for example, one or more light-emitting diodes (LEDs), or a display screen. The indicators 245 can be configured to display conditions of, or information associated with, the power tool 100. For example, the indicators 245 can display information relating to an operational state of the power tool 100, such as a mode or speed setting. The indicators 245 may also display information relating to a fault condition, or other abnormality of the power tool 100. In addition to or in place of visual indicators, the indicators 245 may also include a speaker or a tactile feedback mechanism to convey information to a user through audible or tactile outputs. In some embodiments, the indicators 245 display information relating to whether or not the gearbox inductor 262 is being controlled, a current value provided to the gearbox inductor 262, or the like.

The battery pack interface 110 is connected to the power tool controller 200 and is configured to couple with a battery pack 280. The battery pack interface 110 includes a combination of mechanical (e.g., a battery pack receiving portion) and electrical components configured to and operable for interfacing (e.g., mechanically, electrically, and communicatively connecting) the power tool 100 with the battery pack 280. The battery pack interface 110 is coupled to the power input unit 260. The battery pack interface 110 transmits the power received from the battery pack 280 to the power input unit 260. The power input unit 260 includes active and/or passive components (e.g., voltage step-down controllers, voltage converters, rectifiers, filters, etc.) to regulate or control the power received through the battery pack interface 110 and to the power tool controller 200. In some embodiments, the battery pack interface 110 is also coupled to the power switching network 255. The operation of the power switching network 255, as controlled by the power tool controller 200, determines how power is supplied to the motor 250.

The secondary sensor(s) 270 may include voltage sensors, current sensors, speed sensors, temperature sensors, torque sensors, motion sensors, and the like, to detect various conditions of the power tool 100, such as a voltage of the motor 250, a current of the motor 250, a speed of the motor 250, a temperature of the motor 250, a temperature of the power switching network 255, and the like.

Figure 3:
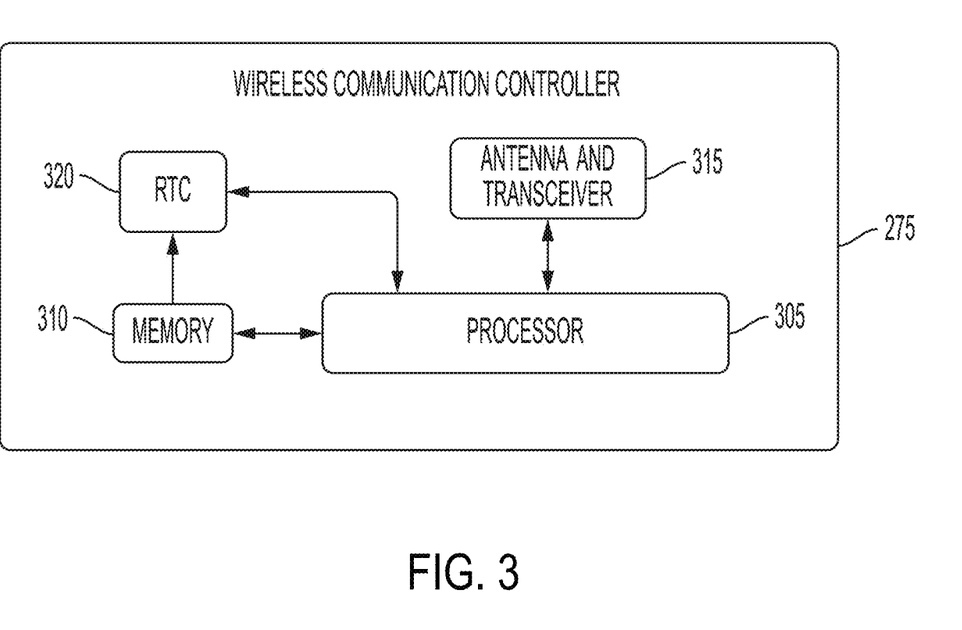
FIG. 3 illustrates a block diagram of a wireless communication controller in accordance with embodiments described herein.

In some embodiments, the power tool controller 200 includes a wireless communication controller 275 for communicating over a wireless network. FIG. 3 illustrates an example wireless communication controller 275. As shown in FIG. 3, the wireless communication controller 275 includes a processor 305, a memory 310, an antenna and transceiver 315, and a real-time clock (RTC) 320. The wireless communication controller 275 enables the power tool 100 to communicate with an external device 405 (see, e.g., FIG. 4). The radio antenna and transceiver 315 operate together and send and receive wireless messages to and from the external device 405 and the processor 305. The memory 310 can store instructions to be implemented by the processor 305 and/or may store data related to communications between the power tool 100 and the external device 405. For example, the processor 305 associated with the wireless communication controller 275 buffers incoming and/or outgoing data, communicates with the power tool device controller, and determines the communication protocol and/or settings to use in wireless communications. The communication via the wireless communication controller 275 can be encrypted to protect the data exchanged between the power tool device and the external device 405 from third parties.

In the illustrated embodiment, the wireless communication controller 275 is a Bluetooth® controller. The Bluetooth® controller communicates with the external device 405 employing the Bluetooth® protocol. Therefore, in the illustrated embodiment, the external device 405 and the power tool device are within a communication range (i.e., in proximity) of each other while they exchange data. In other embodiments, the wireless communication controller 275 communicates using other protocols (e.g., Wi-Fi, ZigBee, a proprietary protocol, etc.) over different types of wireless networks. For example, the wireless communication controller 275 may be configured to communicate via Wi-Fi through a wide area network such as the Internet or a local area network, or to communicate through a piconet (e.g., using infrared or NFC communications).

In some embodiments, the network is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a 4G LTE network, 5G New Radio, a Digital Enhanced Cordless Telecommunications ("DECT") network, a Digital AMPS ("IS-136/TDMA") network, or an Integrated Digital Enhanced Network ("iDEN") network, etc.

The wireless communication controller 275 is configured to receive data from the power tool controller 200 and relay the information to the external device 405 via the antenna and transceiver 315. In a similar manner, the wireless communication controller 275 is configured to receive information (e.g., configuration and programming information) from the external device 405 via the antenna and transceiver 315 and relay the information to the power tool controller 200.

Figure 4:
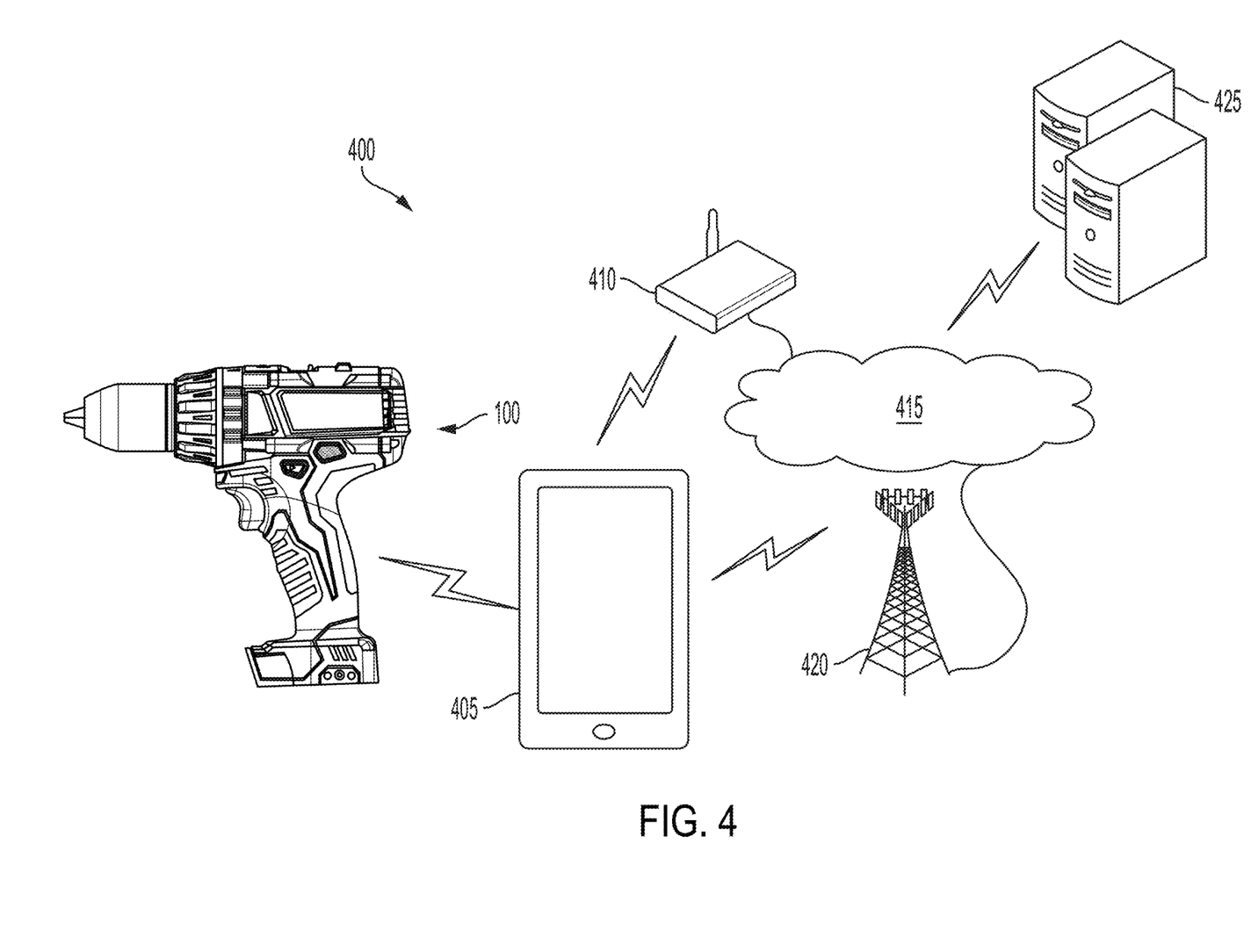
FIG. 4 illustrates a communication system for the power tool of FIG. 1 in accordance with embodiments described herein.

FIG. 4 illustrates a communication system 400. The communication system 400 includes at least one power tool 100 and the external device 405. The power tool 100 and the external device 405 can communicate wirelessly while they are within a communication range of each other. Each power tool 100 may communicate power tool device status, power tool device operation statistics, power tool device identification, power tool device sensor data, stored power tool device usage information, power tool device maintenance information, and the like. In some embodiments, other devices are connected to the power tool 100 and the external device 405, such as a battery pack, a battery pack charger, or other power tool devices.

The external device 405 is, for example, a smart phone (as illustrated), a laptop computer, a tablet computer, a personal digital assistant (PDA), or another electronic device capable of communicating wirelessly with the power tool 100 and providing a user interface. The external device 405 provides the user interface and allows a user to access and interact with the power tool 100. The external device 405 can receive user inputs to determine operational parameters, enable or disable features (such as a low-power operating mode), and the like. The user interface of the external device 405 provides an easy-to-use interface for the user to control and customize operation of the power tool 100. The external device 405, therefore, grants the user access to tool operational data of the power tool 100, and provides a user interface such that the user can interact with the power tool controller 200.

In addition, as shown in FIG. 4, the external device 405 can also share the tool operational data obtained from the power tool 100 with a remote server 425 connected through a network 415. The remote server 425 may be used to store the tool operational data obtained from the external device 405, provide additional functionality and services to the user, or a combination thereof. In some embodiments, storing the information on the remote server 425 allows a user to access the information from a plurality of different locations. In some embodiments, the remote server 425 collects information from various users regarding their power tool devices and provide statistics or statistical measures to the user based on information obtained from the different power tools. For example, the remote server 425 may provide statistics regarding the experienced efficiency of the power tool 100, typical usage of the power tool 100, use of the magnetically susceptible fluid, an age of the magnetically susceptible fluid, and other relevant characteristics and/or measures of the power tool 100. The network 415 may include various networking elements (routers 410, hubs, switches, cellular towers 420, wired connections, wireless connections, etc.) for connecting to, for example, the Internet, a cellular data network, a local network, or a combination thereof as previously described. In some embodiments, the power tool 100 is configured to communicate directly with the server 425 through an additional wireless interface or with the same wireless interface that the power tool 100 uses to communicate with the external device 405.

Figure 5A:
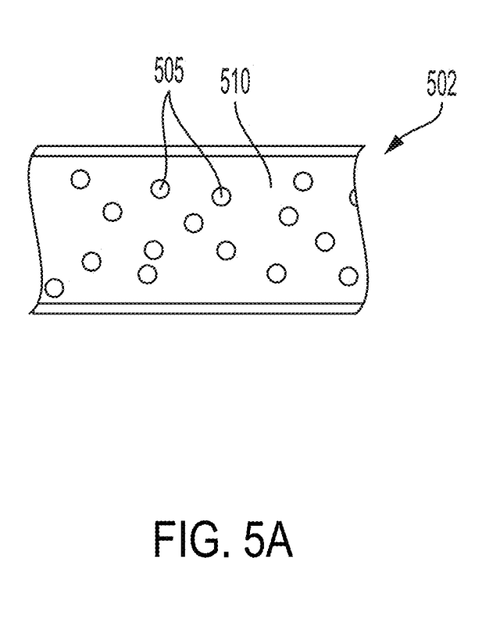
FIGS. 5A-5C illustrate a magnetically susceptible fluid in accordance with embodiments described herein.
Figure 5B:
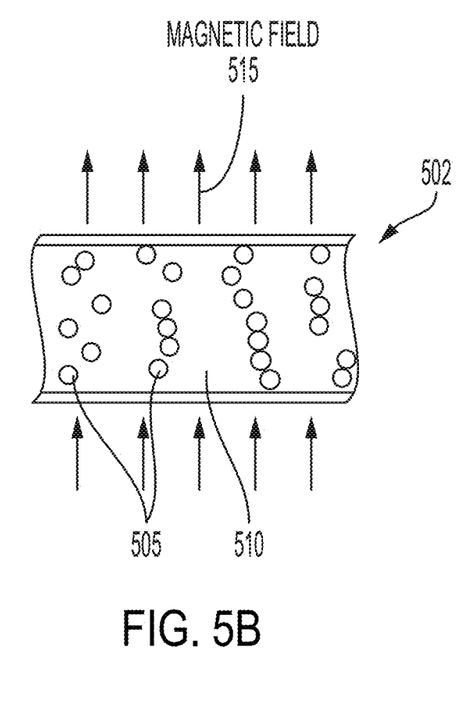
Figure 5C:
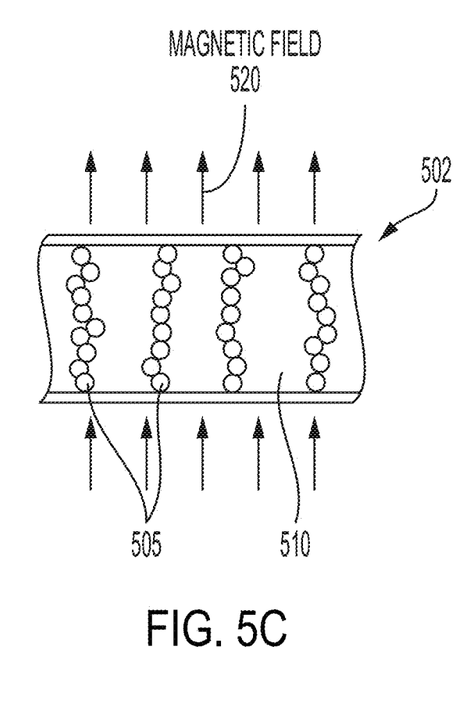

The power tool 100 may include a magnetically susceptible fluid to assist with braking the motor 250. In some embodiments, the magnetically susceptible fluid is a magneto-rheological (MR) fluid 502 that includes, for example, micron-sized magnetizable particles 505 in a carrier fluid 510 (for example, as shown in FIGS. 5A-5C). In the example of FIGS. 5A-5C, the MR fluid 502 is located in a tube. However, in other embodiments, the MR fluid 502 is located within the drive train or gearbox 252. In some embodiments, the MR fluid 502 changes from a free-flowing liquid to a semi-solid with controllable yield strength based on a strength of a magnetic field applied to the MR fluid 502 by the gearbox inductor 262. For example, in FIG. 5A when the gearbox inductor 262 does not apply a magnetic field to the MR fluid 502, the MR fluid 502 is a free-flowing liquid because movement of the particles 505 is not restricted by a magnetic field. In FIG. 5B, the gearbox inductor 262 applies a magnetic field 515 to the MR fluid 502 and causes the particles 505 to at least partially align with the direction of the magnetic field 515. Accordingly, the movement of the MR fluid 502 is restricted in proportion to the strength of the magnetic field 715. In FIG. 5C, the gearbox inductor 262 applies a magnetic field 520 that is stronger than the magnetic field 515. Accordingly, as shown in FIG. 5C, the particles 505 further align with the direction of the magnetic field 520 and restrict movement in proportion to the strength of the magnetic field 520. When the magnetic fields 515 and 520 are introduced, the MR fluid 502 functions as, for example, a non-Newtonian fluid, such as a Bingham plastic. In some embodiments, a yield stress (in other words, the stress at which a material begins to deform) of the MR fluid 502 increases proportionally as the strength of the magnetic field applied to the MR fluid 502 increases.

Figure 6:
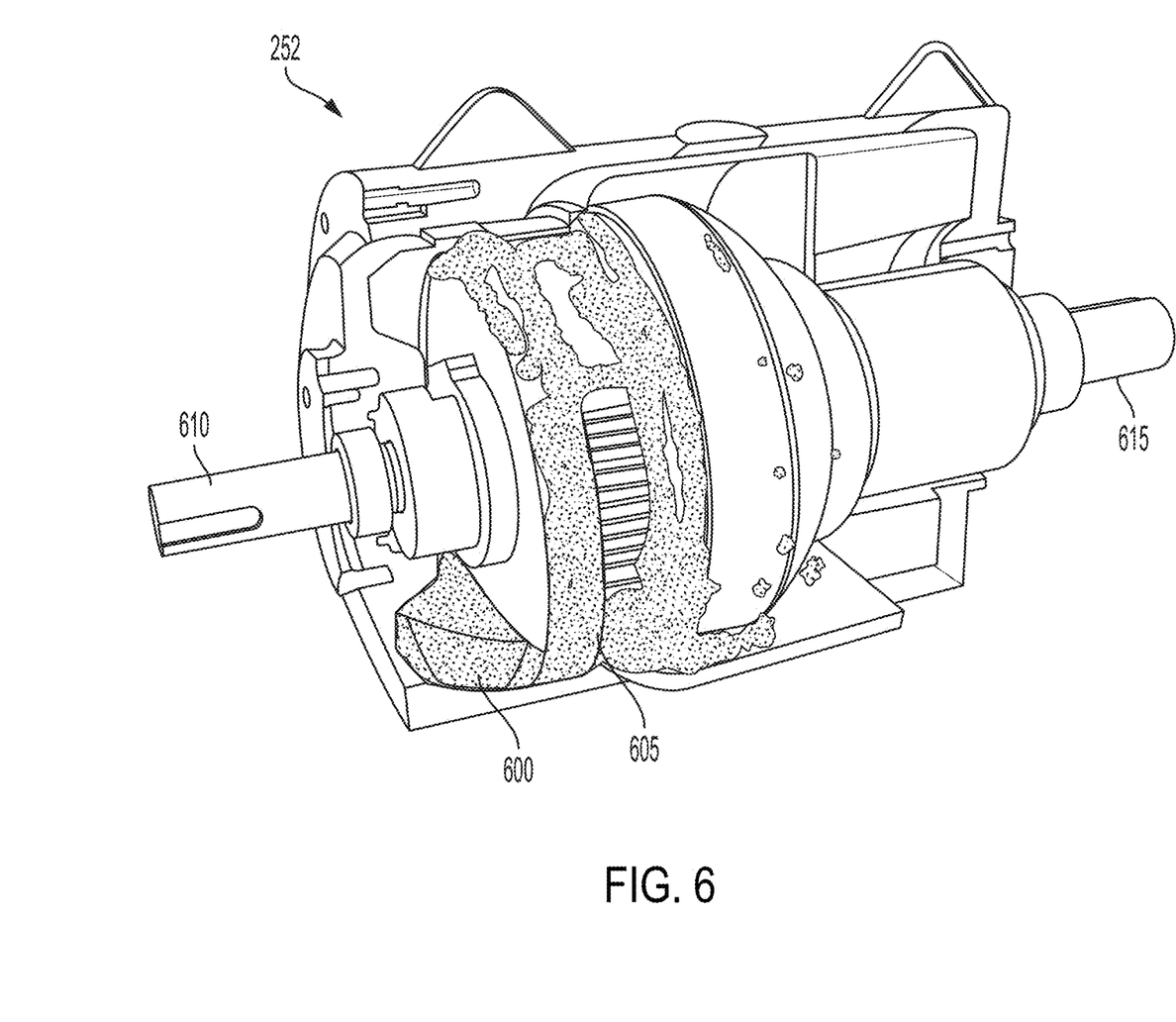
FIG. 6 illustrates a cross-section of gearbox having a magnetically susceptible lubricant in accordance with embodiments described herein.

In some embodiments, the magnetically susceptible fluid is also configured as a lubricant for the gearbox 252, an example of which is illustrated in FIG. 6. The gearbox 252 is configured to, for example, change an output speed and torque of a rotor of the motor 250 based on load conditions. The example gearbox 252 shown in FIG. 6 includes a plurality of gears 605 connected between an input shaft 610 and an output shaft 615. The input shaft 610 may be coupled to the rotor of the motor 250. The gearbox 252 contains a magnetically susceptible fluid 600 that also lubricates (e.g., provides a film of lubricant onto) the plurality of gears 605. When a magnetic field is introduced to the magnetically susceptible fluid 600, the magnetically susceptible fluid 600 thickens, creating additional friction and assisting to stop movement of the plurality of gears 605 and therefore more quickly braking the motor 250.

Figure 7A:
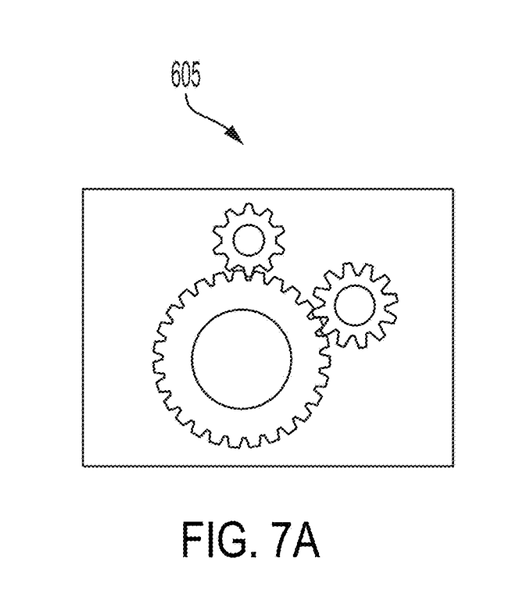
FIGS. 7A-7C illustrate a plurality of gears within the gearbox of FIG. 6 in accordance with embodiments described herein.
Figure 7B:
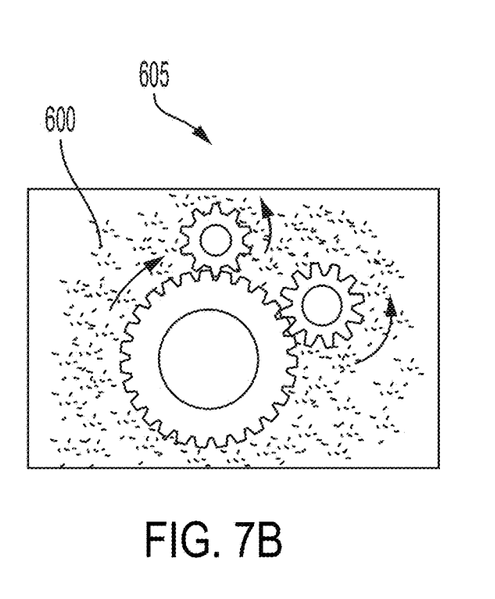
Figure 7C:
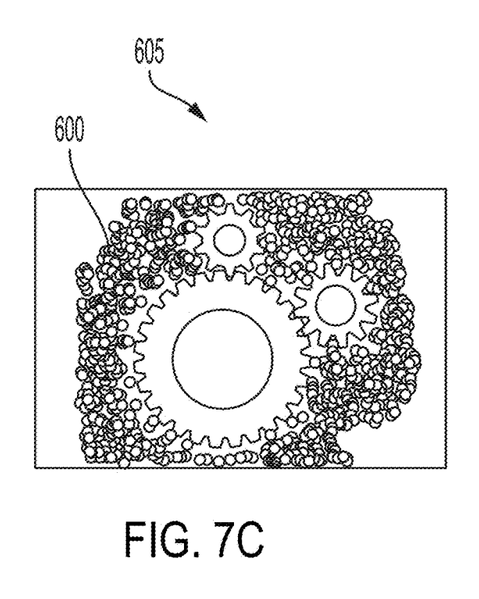

FIGS. 7A-7C illustrate the plurality of gears 605 according to one embodiment. In FIG. 7A, the plurality of gears 605 is provided with no lubricant. In FIG. 7B, the plurality of gears 605 are lubricated with non-magnetized, low viscosity magnetically susceptible fluid 600, allowing the gears to rotate undeterred. In FIG. 7C, a magnetic field (not shown) is provided to the gearbox 252. The magnetic field magnetizes the magnetically susceptible fluid 600, increasing the viscosity and hindering movement of the plurality of gears 605.

Figure 8:
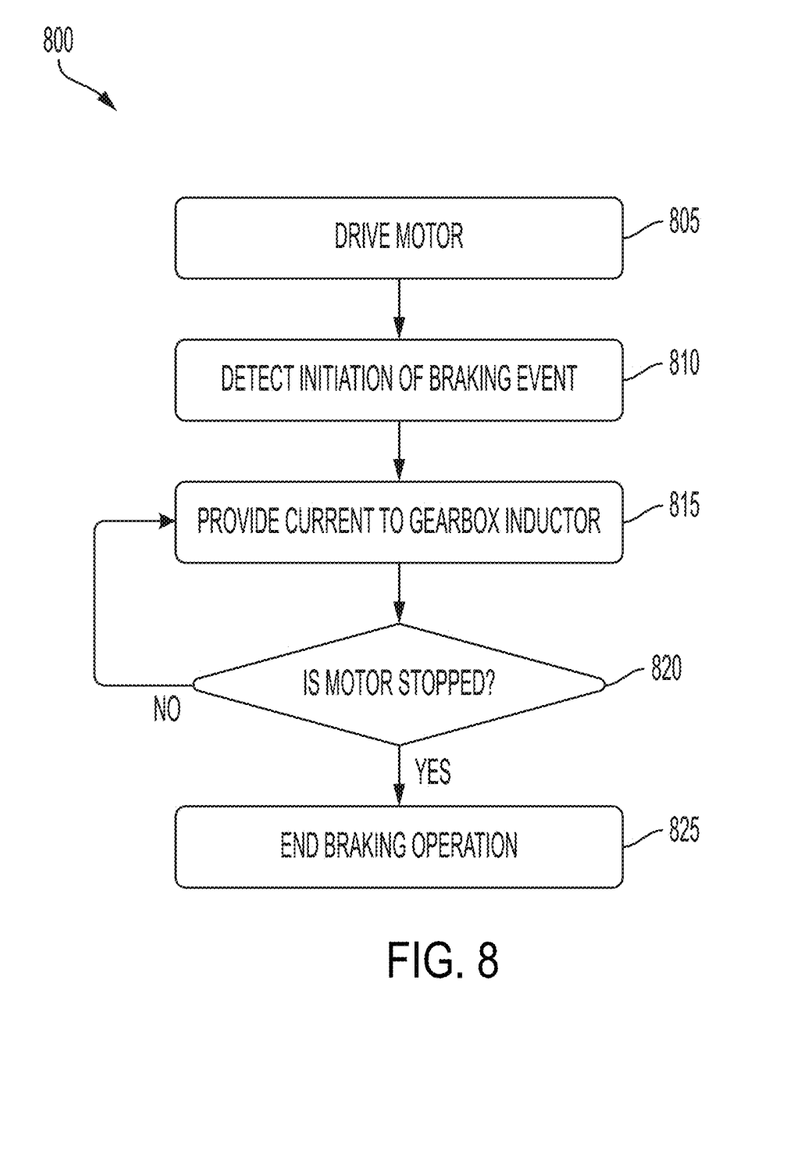
FIG. 8 illustrates a method performed by the controller of FIG. 2 in accordance with embodiments described herein.

FIG. 8 illustrates a method 800 for controlling braking of the motor 250 with the magnetically susceptible fluid. The method 800 may be performed by the power tool controller 200. In some embodiments, the method 800 is performed by the power tool controller 200, the external device 405, the remote server 425, or a combination thereof.

At bock 805, the power tool controller 200 drives the motor 250. For example, the power tool controller 200 drives the motor 250 while the trigger 125 is actuated. In some embodiments, the power tool controller 200 drives the motor 250 according to an amount to which the trigger 125 is actuated (e.g., a distance of depression). For example, the controller 200 drives the motor 250 at a first speed when the trigger 125 is actuated to a first distance, and drives the motor 250 at a second speed when the trigger 125 is actuated to a second distance. When the second distance is greater than the first distance, the second speed is greater than the first speed such that the power tool controller 200 drives the motor 250 at a greater speed the further the trigger 125 is actuated. At block 810, the power tool controller 200 detects initiation of a braking event. For example, the power tool controller 200 detects that the trigger 125 is de-actuated or released. In some instances, the power tool controller 200 detects that the trigger 125 is slightly de-actuated to a lessor distance, indicating that the motor 250 should be slowed but not stopped.

At block 815, the power tool controller 200 provides current to the gearbox inductor 262, thereby inducing a magnetic field on the magnetically susceptible fluid. For example, with reference to FIG. 5C, the power tool controller 200 provides current to the gearbox inductor 262 to generate the magnetic field 520, increasing the viscosity of the MR fluid 502. Increasing the viscosity of the MR fluid 502 adds additional friction to the plurality of gears 605, thereby assisting the motor 250 to more quickly deaccelerate. In some embodiments, the power tool controller 200 provides current to the gearbox inductor 262 in addition to controlling the power switching network 255 to perform a braking operation.

At block 820, the power tool controller 200 determines whether the motor 250 is stopped. For example, the power tool controller 200 may receive a signal from a speed sensor included in the secondary sensor(s) 270 indicating a speed of the motor 250. When the motor 250 is not stopped, the power tool controller 200 returns to block 815 and continues to provide current to the gearbox inductor 262. When the motor 250 is stopped, the power tool controller 200 proceeds to block 825 and ends the braking operation. For example, and with respect to FIG. 5C, the power tool controller 200 stops providing current to the gearbox inductor 262, thereby removing the magnetic field 520 and returning the MR fluid 502 to the non-magnetized state (shown in FIG. 5A).

In some embodiments, while performing the braking operation (e.g., while controlling the gearbox inductor 262, the power switching network 255, or a combination thereof), the power tool controller 200 detects actuation of the trigger 125 indicating to drive the motor 250. In response, the power tool controller 200 can end the braking operation prior to the motor 250 coming to a stop.

Figure 9:
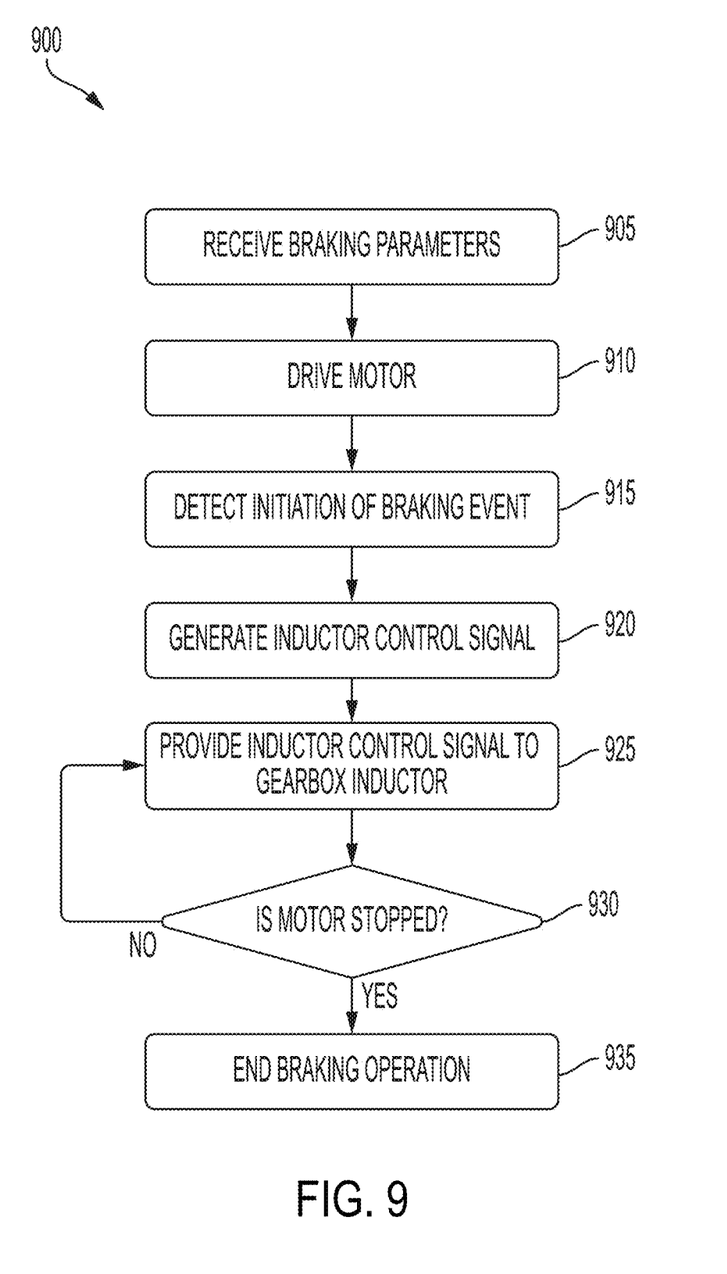
FIG. 9 illustrates another method performed by the controller of FIG. 2 in accordance with embodiments described herein.

In some instances, the braking operation performed by the power tool controller 200 is altered based on inputs received by the power tool 100 (e.g., from the input device 242, from the external device 405, etc.). FIG. 9 illustrates a method 900 for controlling braking of the motor 250 with the magnetically susceptible fluid. The method 900 may be performed by the power tool controller 200. In some embodiments, the method 900 is performed by the power tool controller 200, the external device 405, the remote server 425, or a combination thereof.

At block 905, the power tool controller 200 receives braking parameters. For example, a user of the external device 405 may select whether or not to control the magnetically susceptible fluid during a braking operation (e.g., turn control of the magnetically susceptible fluid ON or OFF), alter a minimum viscosity of the magnetically susceptible fluid, alter a maximum viscosity of the magnetically susceptible fluid, adjust an amount of braking force applied by the magnetically susceptible fluid, select a desired amount of time to fully brake the motor 250, adjust conditions for initiating the braking operation, and the like. The power tool controller 200 may, for example, receive the braking parameters via the input device 242 or the external device 405.

At block 910, the power tool controller 200 drives the motor 250. For example, the power tool controller 200 drives the motor 250 while the trigger 125 is actuated. In some embodiments, the power tool controller 200 drives the motor 250 according to an amount to which the trigger 125 is actuated (e.g., a distance of depression). At block 915, the power tool controller 200 detects initiation of a braking event. For example, the power tool controller 200 detects that the trigger 125 is de-actuated or released. In some instances, the power tool controller 200 detects that the trigger 125 is slightly de-actuated to a lessor distance, indicating that the motor 250 should be slowed but not stopped.

At block 920, the power tool controller 200 generates an inductor control signal based on the braking parameters. For example, the power tool controller 200 determines a current value to provide to the gearbox inductor 262 based on the braking parameter (thereby determining a strength of the magnetic field), determines an amount of time to provide current to the gearbox inductor 262, or the like. At block 925, the power tool controller 200 provides the generated inductor control signal to the gearbox inductor 262, thereby inducing a magnetic field on the magnetically susceptible fluid based on the received braking parameters.

At block 930, the power tool controller 200 determines whether the motor 250 is stopped. For example, the power tool controller 200 may receive a signal from a speed sensor included in the secondary sensor(s) 270 indicating a speed of the motor 250. When the motor 250 is not stopped, the power tool controller 200 returns to block 925 and continues to provide current to the gearbox inductor 262. When the motor 250 is stopped, the power tool controller 200 proceeds to block 935 and ends the braking operation.

REPRESENTATIVE FEATURES

Representative features are set out in the following clauses, which stand alone or may be combined, in any combination, with one or more features disclosed in the text and/or drawings of the specification.

1. A power tool comprising:
    a housing;
    a motor within the housing;
    a drive train coupled to the motor;
    a magnetically susceptible fluid located within the drive train;
    an inductor within the housing and configured to introduce a magnetic field to the magnetically susceptible fluid; and
    an electronic controller including a memory and an electronic processor, the electronic controller connected to the motor and to the inductor, the electronic controller configured to:
        receive a signal to initiate a braking process,
        generate, in response to the signal to initiate the braking process, a control signal for the inductor, and
        provide the control signal to the inductor to control a viscosity of the magnetically susceptible fluid located within the drive train.
2. The power tool of clause 1, wherein the drive train includes:
    one or more gears, wherein the magnetically susceptible fluid is configured to lubricate the one or more gears when in a non-magnetized state.
3. The power tool of any of the preceding clauses, wherein the viscosity of the magnetically susceptible fluid is proportional to a strength of the magnetic field.
4. The power tool of any of the preceding clauses, wherein the magnetically susceptible fluid is a magneto-rheological fluid including a plurality of magnetizable particles.
5. The power tool of clause 4, wherein the electronic controller is further configured to: provide the control signal to the inductor to magnetize the plurality of magnetizable particles.
6. The power tool of any of the preceding clauses, wherein the electronic controller is further configured to:
    determine whether the motor has braked to a stop; and
    stop, in response to the motor being braked to a stop, providing the control signal to the inductor.
7. The power tool of any of the preceding clauses, wherein the electronic controller is further configured to:
    receive, from an external device, one or more braking parameters; and
    generate the control signal for the inductor based on the one or more braking parameters.
8. The power tool of clause 7, wherein the one or more braking parameters include at least one selected from a group consisting of a minimum viscosity of the magnetically susceptible fluid, a maximum viscosity of the magnetically susceptible fluid, a braking force applied by the magnetically susceptible fluid, and an amount of time to provide the control signal to the inductor.
9. A method for braking a power tool, the method comprising:
    receiving a signal to initiate a braking process to brake a motor, wherein the motor is coupled to a drive train;
    generating, in response to the signal to initiate the braking process, a control signal for an inductor, the inductor configured to introduce a magnetic field to a magnetically susceptible fluid within the drive train; and providing, during the braking process, the control signal to the inductor to control a
    viscosity of the magnetically susceptible fluid within the drive train.
10. The method of clause 9, further comprising:
    lubricating, with the magnetically susceptible fluid, one or more gears within the drive train.
11. The method of any of clauses 9-10, wherein the magnetically susceptible fluid is a magneto-rheological fluid including a plurality of magnetizable particles, and the method further comprising:
    providing the control signal to the inductor to magnetize the plurality of magnetizable particles.
12. The method of any of clauses 9-11, further comprising:
    determining whether the motor has braked to a stop; and
    stopping, in response to the motor being braked to a stop, providing the control signal to the inductor.
13. The method of any of clauses 9-12, further comprising:
    receiving, from an external device, one or more braking parameters; and
    generating the control signal for the inductor based on the one or more braking parameters.
14. The method of clause 13, wherein the one or more braking parameters include at least one selected from a group consisting of a minimum viscosity of the magnetically susceptible fluid, a maximum viscosity of the magnetically susceptible fluid, a braking force applied by the magnetically susceptible fluid, and an amount of time to provide the control signal to the inductor.
15. A power tool comprising:
    a housing;
    a trigger;
    a motor within the housing;

a drive train coupled to the motor;
a magnetically susceptible fluid located within the drive train;
an inductor within the housing and configured to introduce a magnetic field to the magnetically susceptible fluid;
an electronic controller including a memory and an electronic processor, the electronic controller connected to the trigger, the motor, and the inductor, the electronic controller configured to:
drive, in response to actuation of the trigger, the motor,
initiate, in response to de-actuation of the trigger, a braking event, and
provide, during the braking event, current to the inductor to control a viscosity of the magnetically susceptible fluid located within the drive train.

16. The power tool of clause 15, wherein the drive train includes:
one or more gears, wherein the magnetically susceptible fluid is configured to lubricate the one or more gears when in a non-magnetized state.

17. The power tool of any of clauses 15-16, wherein the magnetically susceptible fluid is a magneto-rheological fluid including a plurality of magnetizable particles.

18. The power tool of clause 17, wherein the electronic controller is further configured to: provide the control signal to the inductor to magnetize the plurality of magnetizable particles.

19. The power tool of any of clauses 15-18, wherein the electronic controller is further configured to:
receive, from an input device, one or more braking parameters; and
generate the control signal for the inductor based on the one or more braking parameters.

20. The power tool of clause 19, wherein the one or more braking parameters include at least one selected from a group consisting of a minimum viscosity of the magnetically susceptible fluid, a maximum viscosity of the magnetically susceptible fluid, a braking force applied by the magnetically susceptible fluid, and an amount of time to provide the control signal to the inductor.

Thus, embodiments provided herein describe, among other things, systems and methods for braking a power tool motor using a magnetically susceptible fluid. Various features and advantages are set forth in the following claims.

What is claimed is:

1. A power tool comprising:
a housing;
a motor within the housing;
a drive train coupled to the motor;
a magnetically susceptible fluid located within the drive train;
an inductor within the housing and configured to introduce a magnetic field to the magnetically susceptible fluid; and
an electronic controller including a memory and an electronic processor, the electronic controller connected to the motor and to the inductor, the electronic controller configured to:
receive a signal to initiate a braking process,
generate, in response to the signal to initiate the braking process, a control signal for the inductor, and
provide the control signal to the inductor to control a viscosity of the magnetically susceptible fluid located within the drive train.

2. The power tool of claim 1, wherein the drive train includes:
one or more gears, wherein the magnetically susceptible fluid is configured to lubricate the one or more gears when in a non-magnetized state.

3. The power tool of claim 1, wherein the viscosity of the magnetically susceptible fluid is proportional to a strength of the magnetic field.

4. The power tool of claim 1, wherein the magnetically susceptible fluid is a magneto-rheological fluid including a plurality of magnetizable particles.

5. The power tool of claim 4, wherein the electronic controller is further configured to:
provide the control signal to the inductor to magnetize the plurality of magnetizable particles.

6. The power tool of claim 1, wherein the electronic controller is further configured to:
determine whether the motor has braked to a stop; and
stop, in response to the motor being braked to a stop, providing the control signal to the inductor.

7. The power tool of claim 1, wherein the electronic controller is further configured to:
receive, from an external device, one or more braking parameters; and
generate the control signal for the inductor based on the one or more braking parameters.

8. The power tool of claim 7, wherein the one or more braking parameters include at least one selected from a group consisting of a minimum viscosity of the magnetically susceptible fluid, a maximum viscosity of the magnetically susceptible fluid, a braking force applied by the magnetically susceptible fluid, and an amount of time to provide the control signal to the inductor.

9. A method for braking a power tool, the method comprising:
receiving a signal to initiate a braking process to brake a motor, wherein the motor is coupled to a drive train;
generating, in response to the signal to initiate the braking process, a control signal for an inductor, the inductor configured to introduce a magnetic field to a magnetically susceptible fluid within the drive train; and
providing, during the braking process, the control signal to the inductor to control a viscosity of the magnetically susceptible fluid within the drive train.

10. The method of claim 9, further comprising:
lubricating, with the magnetically susceptible fluid, one or more gears within the drive train.

11. The method of claim 9, wherein the magnetically susceptible fluid is a magneto-rheological fluid including a plurality of magnetizable particles, and the method further comprising:
providing the control signal to the inductor to magnetize the plurality of magnetizable particles.

12. The method of claim 9, further comprising:
determining whether the motor has braked to a stop; and
stopping, in response to the motor being braked to a stop, providing the control signal to the inductor.

13. The method of claim 9, further comprising:
receiving, from an external device, one or more braking parameters; and
generating the control signal for the inductor based on the one or more braking parameters.

14. The method of claim 13, wherein the one or more braking parameters include at least one selected from a group consisting of a minimum viscosity of the magnetically susceptible fluid, a maximum viscosity of the magnetically susceptible fluid, a braking force applied by the magnetically susceptible fluid, and an amount of time to provide the control signal to the inductor.

15. A power tool comprising:
a housing;
a trigger;
a motor within the housing;
a drive train coupled to the motor;
a magnetically susceptible fluid located within the drive train;
an inductor within the housing and configured to introduce a magnetic field to the magnetically susceptible fluid;
an electronic controller including a memory and an electronic processor, the electronic controller connected to the trigger, the motor, and the inductor, the electronic controller configured to:
drive, in response to actuation of the trigger, the motor,
initiate, in response to de-actuation of the trigger, a braking event, and
provide, during the braking event, current to the inductor to control a viscosity of the magnetically susceptible fluid located within the drive train.

16. The power tool of claim 15, wherein the drive train includes:
one or more gears, wherein the magnetically susceptible fluid is configured to lubricate the one or more gears when in a non-magnetized state.

17. The power tool of claim 15, wherein the magnetically susceptible fluid is a magneto-rheological fluid including a plurality of magnetizable particles.

18. The power tool of claim 17, wherein the electronic controller is further configured to:
provide the control signal to the inductor to magnetize the plurality of magnetizable particles.

19. The power tool of claim 15, wherein the electronic controller is further configured to:
receive, from an input device, one or more braking parameters; and
generate the control signal for the inductor based on the one or more braking parameters.

20. The power tool of claim 19, wherein the one or more braking parameters include at least one selected from a group consisting of a minimum viscosity of the magnetically susceptible fluid, a maximum viscosity of the magnetically susceptible fluid, a braking force applied by the magnetically susceptible fluid, and an amount of time to provide the control signal to the inductor.

* * * * *